(12) United States Patent
Kubara et al.

(10) Patent No.: US 11,360,260 B2
(45) Date of Patent: Jun. 14, 2022

(54) OPTICAL FIBER MANUFACTURING METHOD AND OPTICAL FIBER

(71) Applicant: SUMITOMO ELECTRIC INDUSTRIES, LTD., Osaka (JP)

(72) Inventors: Saori Kubara, Osaka (JP); Suguru Takasaki, Osaka (JP); Shuhei Toyokawa, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 0 days.

(21) Appl. No.: 16/970,685

(22) PCT Filed: Feb. 19, 2019

(86) PCT No.: PCT/JP2019/006034
§ 371 (c)(1),
(2) Date: Aug. 18, 2020

(87) PCT Pub. No.: WO2019/163748
PCT Pub. Date: Aug. 29, 2019

(65) Prior Publication Data
US 2020/0379170 A1    Dec. 3, 2020

(30) Foreign Application Priority Data

Feb. 20, 2018 (JP) .............................. JP2018-028092

(51) Int. Cl.
*G02B 6/255* (2006.01)
*G02B 6/02* (2006.01)
(Continued)

(52) U.S. Cl.
CPC ...... *G02B 6/02395* (2013.01); *C03C 25/1065* (2013.01); *G02B 6/245* (2013.01); *G02B 6/2552* (2013.01)

(58) Field of Classification Search
CPC .................................................. G02B 6/2558
See application file for complete search history.

(56) References Cited

U.S. PATENT DOCUMENTS

| 2002/0048437 A1* | 4/2002 | Nakamura ........... G02B 6/2551 385/96 |
| 2003/0039440 A1 | 2/2003 | Gatica et al. |

(Continued)

FOREIGN PATENT DOCUMENTS

| EP | 0978739 A2 * | 2/2000 | ........... G02B 6/2558 |
| JP | H05-264848 A | 10/1993 | |

(Continued)

*Primary Examiner* — Charlie Y Peng
(74) *Attorney, Agent, or Firm* — Faegre Drinker & Biddle & Reath LLP (57) ABSTRACT

A method for manufacturing an optical fiber includes: exposing a glass fiber by stripping a fiber coating layer at an end portion, on a splicing side, of each of a pair of optical fibers; fusion-splicing the glass fibers; and recoating a protective resin on a periphery of exposed portions of the glass fibers. The fiber coating layer includes a primary resin layer on an inner peripheral side and having a Young's modulus of 0.5 MPa or less and a secondary resin layer on an outer peripheral side and having a Young's modulus of 800 MPa or greater, the exposing includes forming a shape of a coating edge of the fiber coating layer which includes the primary resin layer and the secondary resin layer into a tapered shape which becomes narrower toward the end portion side, and the recoating includes coating the protective resin to include the coating edge.

1 Claim, 4 Drawing Sheets (51) Int. Cl.
    *C03C 25/1065*     (2018.01)
    *G02B 6/245*     (2006.01)

(56) References Cited

U.S. PATENT DOCUMENTS

| | | | |
|---|---|---|---|
| 2005/0158001 A1* | 7/2005 | Fabian | C08G 18/672 |
| | | | 385/128 |
| 2008/0118208 A1* | 5/2008 | Monte | G02B 6/25 |
| | | | 385/96 |
| 2014/0248023 A1 | 9/2014 | Nishimura et al. | |
| 2014/0308015 A1 | 10/2014 | Bookbinder et al. | |
| 2016/0370543 A1* | 12/2016 | Ocampo | C03C 25/70 |
| 2017/0031092 A1 | 2/2017 | Sohma et al. | |
| 2017/0307814 A1 | 10/2017 | Tachinbana et al. | |

FOREIGN PATENT DOCUMENTS

| | | | | |
|---|---|---|---|---|
| JP | 2004-331431 A | 11/2004 | | |
| JP | 2008-527420 A | 7/2008 | | |
| JP | 2011-102915 A | 5/2011 | | |
| JP | 2013-186243 A | 9/2013 | | |
| JP | 2015-182912 A | 10/2015 | | |
| JP | 2015-219271 A | 12/2015 | | |
| JP | 2016-070966 A | 5/2016 | | |
| WO | WO-2006-073992 A1 | 7/2006 | | |
| WO | WO-2011118293 A1 * | 9/2011 | | G02B 6/02138 |
| WO | WO-2013-153734 A1 | 10/2013 | | |

\* cited by examiner

|  | FIRST EXAMPLE | SECOND EXAMPLE |
|---|---|---|
| GLASS FIBER OUTER DIAMETER (μm) | 125 | 125 |
| PRIMARY RESIN OUTER DIAMETER (μm) | 200 | 200 |
| SECONDARY RESIN OUTER DIAMETER (μm) | 245 | 245 |
| PROTECTIVE RESIN OUTER DIAMETER (μm) | 260 | 260 |
| GLASS FIBER YOUNG'S MODULUS (MPa) | 74500 | 74500 |
| PRIMARY RESIN YOUNG'S MODULUS (MPa) | 0.15 | 0.45 |

OPTICAL FIBER MANUFACTURING METHOD AND OPTICAL FIBER

TECHNICAL FIELD

The present disclosure relates to a method for manufacturing an optical fiber and the optical fiber.

This application is based upon and claims the benefit of priority from Japanese Patent Application No. 2018-028092, filed Feb. 20, 2018, the entire contents of which are incorporated herein by reference.

BACKGROUND ART

As an optical fiber, for example, an optical fiber having a long length of several tens of kilometers such as a submarine cable is manufactured in response to a request from a user. The above-described optical fiber having the long length is usually formed by fusion-splicing a plurality of optical fibers. Here, it is required that peeling and cracking do not occur at an interface between a protective resin that protects a splicing portion and an original coating resin. For example, Patent Literature 1 discloses that a shape of a coating edge of a fiber coating layer is formed into a tapered shape, and the protective resin of a portion covering the edge of the fiber coating layer is thickened, whereby the protective resin is prevented from peeling or cracking.

On the other hand, in an optical transmission network that supports a transmission speed of 100 Gbit/s or more, a higher optical signal-to-noise ratio (OSNR) is required in order to expand the communication capacity per core of the optical fiber. One method of improving the OSNR it to reduce nonlinearity of the optical fiber. In order to do so, it is required to increase an effective cross-sectional area Aeff of the optical fiber and to reduce transmission loss of the optical fiber.

When a nonlinear refractive index of the optical fiber is defined as n2 and the effective cross-sectional area of the optical fiber is defined as Aeff, the nonlinearity of the optical fiber is defined as n2/Aeff. As the effective cross-sectional area Aeff is larger, concentration of an optical power density on a core can be avoided, such that the nonlinearity deteriorates. However, when the effective cross-sectional area Aeff becomes large, the optical fiber becomes weak against a side pressure, such that loss at the time of bobbin winding becomes large. Since the loss in a bobbin winding state is large and a relaxation speed is slow, it takes a long time to change from the magnitude of the loss in the bobbin winding state up to the magnitude of original loss of the optical fiber (for example, loss in an optical fiber bundle state). Therefore, Patent Literature 2 discloses that, in order to reduce the loss, the coating layer of the optical fiber is formed with a two-layer structure, and a resin having a low Young's modulus (soft) is used for a primary resin layer on the center side.

CITATION LIST

Patent Literature

Patent Literature 1: JP-A-2011-102915
Patent Literature 2: JP-A-2015-219271

SUMMARY OF INVENTION

A method for manufacturing an optical fiber according to the present disclosure includes: a step of exposing a glass fiber by stripping a fiber coating layer at an end portion, on a splicing side, of each of a pair of optical fibers; a step of fusion-splicing end surfaces of the glass fibers; and a step of recoating a protective resin on a periphery of exposed portions of the glass fibers, in which the fiber coating layer includes a primary resin layer on an inner peripheral side and having a Young's modulus of 0.5 MPa or less and a secondary resin layer on an outer peripheral side and having a Young's modulus of 800 MPa or greater, the step of exposing is a step of forming a shape of a coating edge of the fiber coating layer which includes the primary resin layer and the secondary resin layer into a tapered shape which becomes narrower toward the end portion side, and the step of recoating is a step of coating the protective resin to include the coating edge.

An optical fiber according to the present disclosure is an optical fiber in which a fiber coating layer at an end portion, on a splicing side, of each of a pair of optical fibers is stripped, end surfaces of glass fibers are fusion-spliced, and a protective resin is provided on a periphery of a fused portion of the glass fibers, in which the fiber coating layer includes a secondary resin layer on an outer peripheral side and a primary resin layer on an inner peripheral side and having a Young's modulus of 0.15 MPa or greater and 0.5 MPa or less, a coating edge of the primary resin layer and the secondary resin layer at an end portion of the optical fiber has a tapered shape which becomes narrower toward the end portion side, the protective resin is provided to include the coating edge, and a length of the taper in an axial direction of the optical fiber is equal to or longer than 280 μm.

DESCRIPTION OF EMBODIMENTS

Technical Problem

Figure 5:
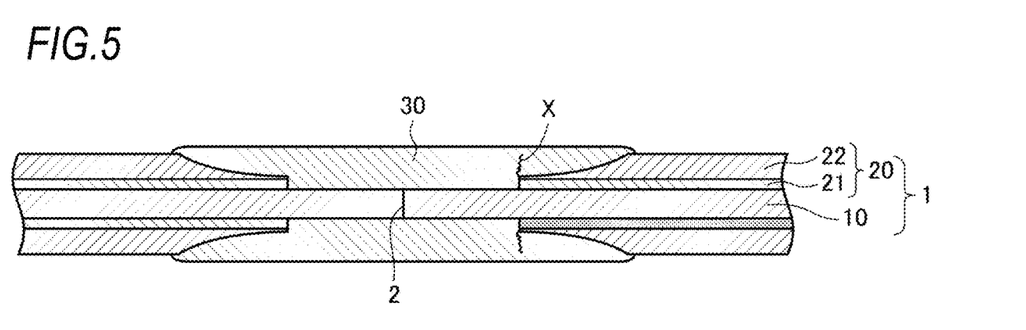
FIG. 5 is a diagram illustrating a configuration of a splicing portion of a related-art optical fiber including a coating layer of a two-layer structure.

In a submarine cable using an optical fiber having a coating layer of a two-layer structure, a crack may occur in a protective resin of a splicing portion. FIG. 5 is a diagram illustrating a configuration of a splicing portion of a related-art optical fiber having a coating layer of a two-layer structure, and the splicing portion is formed by splicing the optical fibers which are provided with a glass fiber 10 and a fiber coating layer 20 of the two-layer structure including a primary resin layer 21 on the center side around the glass fiber 10 and a secondary resin layer 22 on the outer peripheral side. The fiber coating layer 20 is stripped from an end portion of each optical fiber, and the exposed glass fibers 10 are fusion-spliced at a fusion-splicing portion 2.

At the splicing portion of the optical fiber illustrated in FIG. 5, the coating layer is stripped in a tapered shape whose diameter is reduced toward the side of the fusion-splicing portion 2. For example, in a method of grinding the coating layer with a grindstone, when the primary resin layer 21 is soft, the primary resin layer 21 is deformed and thus grinding cannot be performed well, such that FIG. 5 illustrates a case where a taper is formed in only the secondary resin layer 22 and the taper is not formed in the primary resin layer 21. The protective resin 30 is molded and recoated to cover the fusion-splicing portion 2 and the entire stripped portion of the fiber coating layer 20.

As described above, in the related-art splicing portion, the coating of the end portions of the short fibers is stripped and the fusion-splicing is performed, after which the splicing portion is recoated with the protective resin 30. In fusion of the optical fiber in which the primary resin layer 21 is soft and the secondary resin layer 22 is hard, when the optical fiber is pulled after the fusion, while the secondary resin layer 22 is hard to be deformed in an axial direction of the fiber, the primary resin layer 21 is easy to be deformed in the axial direction of the fiber. Therefore, in a coating portion of a fusion portion, there is a problem that a crack X is easy to occur at a boundary portion between the primary resin layer and the secondary resin layer as a starting point.

When the Young's modulus of the primary resin layer 21 is great, the crack is hard to occur in the protective resin 30, such that it is not required to process the primary resin layer 21 into the tapered shape. However, when the Young's modulus of the primary resin layer 21 is small, with respect to the problem that the crack occurs in the protective resin, the inventor found out that the occurrence of the crack can be prevented by stripping the fiber coating layer to form the tapered shape so as to include a region of the primary resin layer. That is, it is desirable that a coating edge (near the boundary) of the primary resin layer 21 and the secondary resin layer 22 after stripping the fiber coating layer is formed as the taper.

The present disclosure has been made in consideration of the above-described circumstances, and an object thereof is to provide a method for manufacturing an optical fiber and the optical fiber capable of preventing occurrence of a crack in a protective resin covering a stripped portion of a fiber coating layer and an exposed portion of a glass fiber in a splicing portion of the optical fiber and performing long-distance transmission with a large communication capacity.

Advantageous Effects of the Present Disclosure

According to the present disclosure, it is possible to provide a method for manufacturing an optical fiber and the optical fiber capable of preventing occurrence of a crack in a protective resin covering a stripped portion of a coating layer and an exposed portion of a glass fiber in a splicing portion of the optical fiber and performing long-distance transmission with a large communication capacity.

Description of Embodiments of the Present Disclosure

First, an embodiment of the present disclosure will be listed and described.

(1) A method for manufacturing an optical fiber according to the present disclosure includes: a step of exposing a glass fiber by stripping a fiber coating layer at an end portion, on a splicing side, of each of a pair of optical fibers; a step of fusion-splicing end surfaces of the glass fibers; and a step of recoating a protective resin on a periphery of exposed portions of the glass fibers, in which the fiber coating layer includes a primary resin layer on an inner peripheral side and having a Young's modulus of 0.5 MPa or less and a secondary resin layer on an outer peripheral side and having a Young's modulus of 800 MPa or greater, the step of exposing is a step of forming a shape of a coating edge of the fiber coating layer which includes the primary resin layer and the secondary resin layer into a tapered shape which becomes narrower toward the end portion side, and the step of recoating is a step of coating the protective resin to include the coating edge.

According to the embodiment, even when a soft resin is used for the primary resin layer of the fiber coating layer, the coating edge (near a boundary) between the primary resin layer and the secondary resin layer after stripping the coating layer is formed as a taper, whereby the stress applied to the protective resin can be reduced at the boundary between the primary resin layer and the secondary resin layer. Therefore, it is possible to obtain an optical fiber capable of preventing occurrence of a crack in the protective resin covering a stripped portion of the coating layer and an exposed portion of the glass fiber in a splicing portion of the optical fiber and performing long-distance transmission with a large communication capacity.

(2) In the method for manufacturing the optical fiber according to the present disclosure, the method for manufacturing the optical fiber according to (1) further includes: a step of irradiating a portion of the fiber coating layer of to be stripped with ultraviolet rays to increase the Young's modulus of the primary resin layer, prior to the step of exposing, in which the step of exposing is a step of forming the coating edge of the fiber coating layer into the tapered shape.

According to the embodiment, even when the soft resin is used for the primary resin layer of the fiber coating layer, the fiber coating layer can be cured before stripping the fiber coating layer, such that the coating edge of the fiber coating layer can be easily processed into the tapered shape. Therefore, when stripping the fiber coating layer by using a tool such as a grindstone and a razor, a variation in shape due to a difference in skills hardly occurs, and thus it is possible to maintain the quality of the manufactured optical fiber cable.

(3) In the method for manufacturing the optical fiber according to the present disclosure, the method for manufacturing the optical fiber according to (1) further includes: a step of cooling a portion of the optical fiber to be stripped to increase the Young's modulus of the primary resin layer, prior to the step of exposing, in which the step of exposing is a step of forming the coating edge of the fiber coating layer into the tapered shape.

According to the embodiment, even when the soft resin is used for the primary resin layer of the fiber coating layer, the fiber coating layer can be cured before stripping the fiber coating layer, such that the coating edge of the fiber coating layer can be easily processed into the tapered shape. Therefore, when stripping the fiber coating layer by using a tool such as a grindstone and a razor, a variation in shape due to a difference in skills hardly occurs, and thus it is possible to maintain the quality of the manufactured optical fiber cable.

(4) An optical fiber according to the present disclosure in which a fiber coating layer at an end portion, on a splicing side, of each of a pair of optical fibers is stripped, end surfaces of glass fibers are fusion-spliced, and a protective resin is provided on a periphery of a fused portion of the glass fibers, in which the fiber coating layer includes a secondary resin layer on an outer peripheral side and a primary resin layer on an inner peripheral side and having a Young's modulus of 0.15 MPa or greater and 0.5 MPa or less, a coating edge of the primary resin layer and the secondary resin layer at an end portion of the optical fiber has a tapered shape which becomes narrower toward the end portion side, the protective resin is provided to include the coating edge, and a length of the taper in an axial direction of the optical fiber is equal to or longer than 280 μm.

According to the embodiment, even when a soft resin is used for the primary resin layer of the fiber coating layer, the coating edge (near a boundary) between the primary resin layer and the secondary resin layer after stripping the coating layer is formed as a taper having a predetermined length, such that the stress applied to the protective resin can be reduced at the boundary between the primary resin layer and the secondary resin layer. Therefore, it is possible to obtain an optical fiber capable of preventing occurrence of a crack in the protective resin covering a stripped portion of the coating layer and an exposed portion of the glass fiber in a splicing portion of the optical fiber and performing long-distance transmission with a large communication capacity.

In the optical fiber according to the present disclosure, in the optical fiber according to (4), an angle of the taper of the coating edge is equal to or less than 10 degrees.

According to the embodiment, it is possible to further surely prevent the occurrence of the crack in the protective resin covering the stripped portion of the coating layer and the exposed portion of the glass fiber in the splicing portion of the optical fiber.

Details of Embodiments of the Present Disclosure

Hereinafter, a specific example of a method for manufacturing an optical fiber and the optical fiber according to the present disclosure will be described with reference to the drawings. The present invention is not limited to the following examples but is indicated by the scope of the claims, and is intended to include all the modifications within meanings equivalent to the scope of the claims, and the scope. The present invention includes a combination of any embodiments as long as a plurality of embodiments can be combined with each other. In the following description, configurations denoted by the same reference signs are regarded as the same configurations even in different drawings, and the description thereof may be omitted.

Figure 1A:
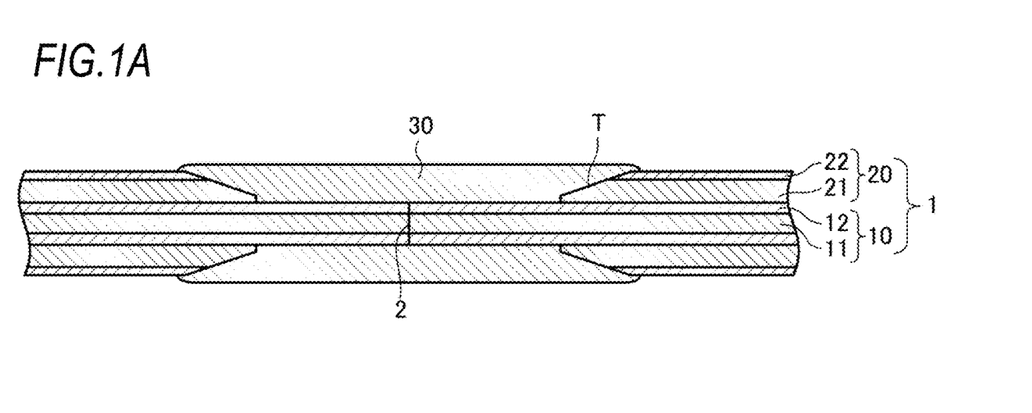
FIG. 1A is a cross-sectional diagram taken along an axial direction of a splicing portion of an optical fiber manufactured according to the present disclosure.
Figure 1B:
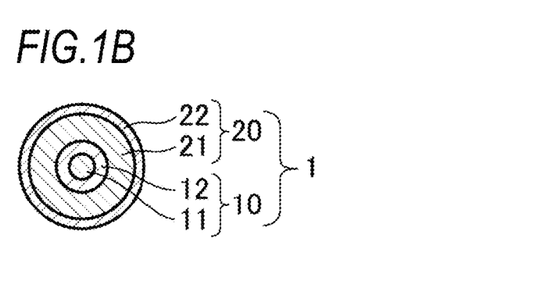
FIG. 1B is a cross-sectional diagram taken along a radial direction at a place other than the splicing portion of the optical fiber manufactured according to the present disclosure.
Figure 2:
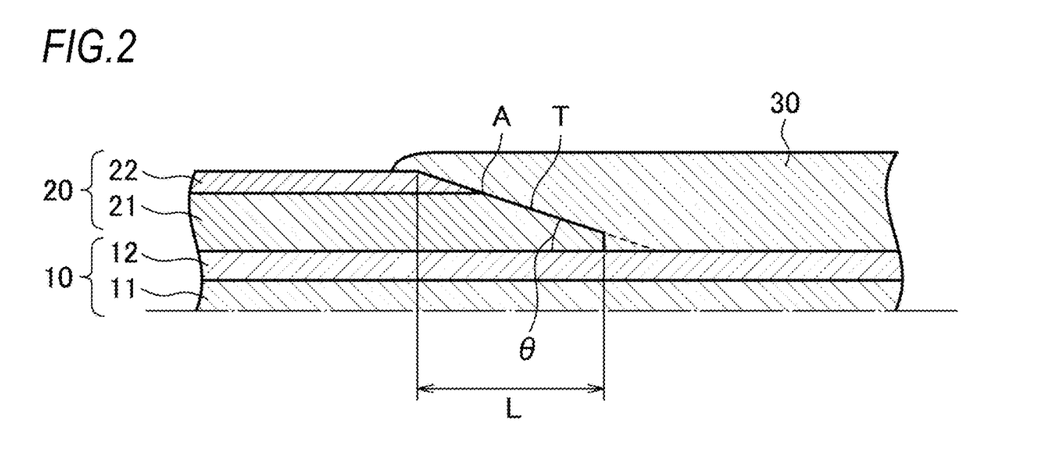
FIG. 2 is a diagram illustrating a main portion of the splicing portion of the optical fiber of FIG. 1A.

FIG. 1A is a cross-sectional diagram taken along an axial direction of a splicing portion of an optical fiber manufactured according to the present disclosure, and FIG. 1B is a cross-sectional diagram taken along a radial direction of a place other than the splicing portion of the optical fiber manufactured according to the present disclosure. FIG. 2 is a diagram illustrating a main portion of the splicing portion of the optical fiber of FIG. 1A. The optical fiber manufactured according to the present disclosure is formed by fusion-splicing a plurality of short optical fibers 1. The optical fiber 1 of the embodiment includes a glass fiber 10 serving as an optical transmission body including a core 11 and a clad 12 and a fiber coating layer 20 including a primary (first) resin layer 21 and a secondary (second) resin layer 22.

The glass fiber 10 is a glass member and is formed of, for example, $SiO_2$ glass. The glass fiber 10 transmits an optical signal introduced into the optical fiber 1. The core 11 is provided in a region including, for example, a central axis of the glass fiber 10. The core 11 contains $GeO_2$ and may further contain a fluorine element. The clad 12 is provided in a region surrounding the core 11. The clad 12 has a refractive index lower than a refractive index of the core 11. The clad 12 may be formed of pure $SiO_2$ glass or may be formed of $SiO_2$ glass to which the fluorine element is added.

In the fusion-splicing of the optical fibers 1, the glass fibers 10 are exposed by stripping the fiber coating layer 20 at each end portion of a pair of optical fibers 1 spliced to each other. End surfaces of the glass fibers 10 which are naked by stripping the fiber coating layer 20 are abutted against each other, and the abutted end surfaces are spliced to each other as a fusion-splicing portion 2 by arc discharge. Since the fusion-splicing portion 2 and the naked glass fiber 10 in the vicinity thereof are easily damaged and mechanically in a weak state, the fusion-splicing portion 2 and the naked glass fiber 10 are recoated with a protective resin 30. As the protective resin 30, an ultraviolet curable resin which is the same type as that of the fiber coating layer is used. The coating of the protective resin 30 can be formed by injecting a resin by using a predetermined molding die.

In the embodiment, as the fiber coating layer 20 of the optical fiber 1, in order to cause the optical fiber 1 to be less likely to be affected by the side pressure at the time of bobbin winding which causes a loss increase, a resin having a low Young's modulus of 0.5 MPa or less is used for the primary resin layer 21 on the center side. A resin having a Young's modulus of 800 MPa or greater which is higher than that of the primary resin layer 21 is used for the secondary resin layer 22 on the outer peripheral side. The magnitude of the Young's modulus of the protective resin 30 is greater than that of the resin of the primary resin layer 21, and is smaller than that of the resin of the secondary resin layer 22. That is, the protective resin 30 whose Young's modulus after curing is between the Young's modulus of the primary resin layer 21 and the Young's modulus of the secondary resin layer 22 is used. For example, it is desirable to use a resin whose Young's modulus after curing is 10 MPa to 500 MPa.

As the resin forming the primary resin layer 21, it is desirable to use one including both or either one of a both-ends reactive oligomer and an one-end reactive oligomer in a composition. When the one-end oligomer is included 50% or more, the strength against the side pressure can be sufficiently secured. Examples of the both-ends reactive oligomer are described as follows:

H-(I-Polypropylene glycol$^A$)$_2$-I-H
H-(I-Polypropylene glycol$^B$)$_2$-I-H
H-(I-Polypropylene glycol$^C$)$_2$-I-H Further, examples of the one-end reactive oligomer are described as follows:

H-(I-Polypropylene glycol$^A$)$_2$-I-X
H-(I-Polypropylene glycol$^B$)$_2$-I-X
H-(I-Polypropylene glycol$^C$)$_2$-I-X Here, H represents a residue of hydroxyethyl acrylate, I represents a residue of isophorone diisocyanate, X represents methanol, and polypropylene glycols$^{A-C}$ respectively represent residues of the following polypropylene glycol. That is, polypropylene glycol$^A$ represents a residue of ACCLAIM 4200 (a molecular weight: 4,000, a degree of unsaturation: 0.003 meq/g), Polypropylene glycol$^B$ represents a residue of XS-3020C (a molecular weight: 3,000, a degree of unsaturation: 0.03 meq/g), and Polypropylene glycol$^C$ represents a residue of EXCENOL 3020 (a molecular weight: 3,000, a degree of unsaturation: 0.09 meq/g). The urethane oligomer is represented by H-(I-propylene glycol)$_2$-I-H.

The both-ends reactive oligomer and the one-end reactive oligomer are not limited to the above-described materials. In addition thereto, for example, the material may be polypropylene glycol or a copolymer of polypropylene glycol and ethylene glycol in which the molecular weight is 1,000 to 13,000, preferably 2,000 to 8,000, and the degree of unsaturation is less than 0.01 meq/g, preferably 0.0001 to 0.009 meq/g. If necessary, the material may contain a urethane compound which contains at least one type (meth) of acrylate group derived from a mixture of the aforementioned material and at least one type of other polyols.

As the resin forming the secondary resin layer 22, for example, the following materials are described. As the oligomer, there is a material obtained by reacting a polyol compound, a polyisocyanate compound, and a hydroxyl group-containing acrylate compound.

As the polyol compound, there are polytetramethylene glycol and polypropylene glycol. As the polyisocyanate compound, there are 2,4-tolylene diisocyanate and isophorone diisocyanate. As the hydroxyl group-containing acrylate compound, there are 2-hydroxyethyl acrylate, 2-hydroxybutyl acrylate, 1,6-hexanediol monoacrylate, and tripropylene glycol diacrylate.

As the monomer, there is an N-vinyl monomer having a cyclic structure, for example, N-vinyl caprolactam. When the monomers are included, it is preferable because the curing rate can be improved. In addition thereto, there are monofunctional monomers such as isobornyl acrylate, benzyl acrylate, 2-hydroxyethyl acrylate, phenoxyethyl acrylate, and polypropylene glycol monoacrylate, and polyfunctional monomers such as polyethylene glycol diacrylate, polypropylene glycol diacrylate or bisphenol A•ethylene oxide addition diol diacrylate.

In the embodiment, a coating edge of the fiber coating layer 20 including the primary resin layer 21 and the secondary resin layer 22 at the end portion of the optical fiber 1 is formed with a taper T in which a coating diameter becomes smaller toward the end portion side. That is, the taper T is formed to include at least a place of a boundary A between the primary resin layer 21 and the secondary resin layer 22. The protective resin 30 is molded to cover the portion of the tapered fiber coating layer 20 and the naked glass fiber 10. According to the configuration, an end surface of the coating edge of the fiber coating layer 20 is covered and is not exposed. Since the coating edge of the fiber coating layer 20 has the tapered shape, an overlapping portion where the fiber coating layer 20 is covered by the protective resin 30 of the coating edge can be thickened, and an adhesive area here is increased, thereby making it possible to improve an adhesive force with the protective resin 30. As will be described later, it is possible to reduce the internal stress acting on the protective resin 30 by allowing a length of the taper T to be equal to or longer than a predetermined length.

In the embodiment, since the soft resin having the Young's modulus of 0.5 MPa or less is used for the primary resin layer 21, it is difficult to form the taper so as to reach the primary resin layer 21 on the inner peripheral side. Therefore, it is desirable that before stripping the fiber coating layer 20 at the end portion of the optical fiber, the fiber coating layer 20 of a portion to be stripped is irradiated with ultraviolet rays to increase the Young's modulus of the primary resin layer 21, after which the coating edge of the fiber coating layer 20 is processed into the tapered shape. Although the fiber coating layer 20 around the glass fiber 10 is applied to the periphery of the glass fiber and is cured by the irradiation of ultraviolet rays at the time of manufacturing the optical fiber 1, by further irradiating the fiber coating layer 20 of the portion to be stripped with ultraviolet rays before the fusion-splicing is performed, it becomes possible to increase the Young's modulus of the primary resin layer 21.

In order to increase the hardness of the portion where the fiber coating layer 20 is stripped, the Young's modulus of the primary resin layer 21 may be increased by cooling the optical fiber 1 of the portion to be stripped, after which the coating edge of the fiber coating layer 20 is formed into the tapered shape. Here, for example, it is desirable to cool the optical fiber 1 at approximately minus 10° C. In order to strip the fiber coating layer 20 to form the taper T, a tool such as a grindstone and a razor can be used. When the Young's modulus of the primary resin layer 21 is increased by cooling the optical fiber 1, it is desirable to use the razor because heat is generated when the fiber coating layer 20 is stripped by the grindstone.

Next, a simulation result of a maximum value of the internal stress acting on the protective resin 30 when a length of the taper T and an angle θ thereof formed on the fiber coating layer 20 are changed will be described.

Figure 3:
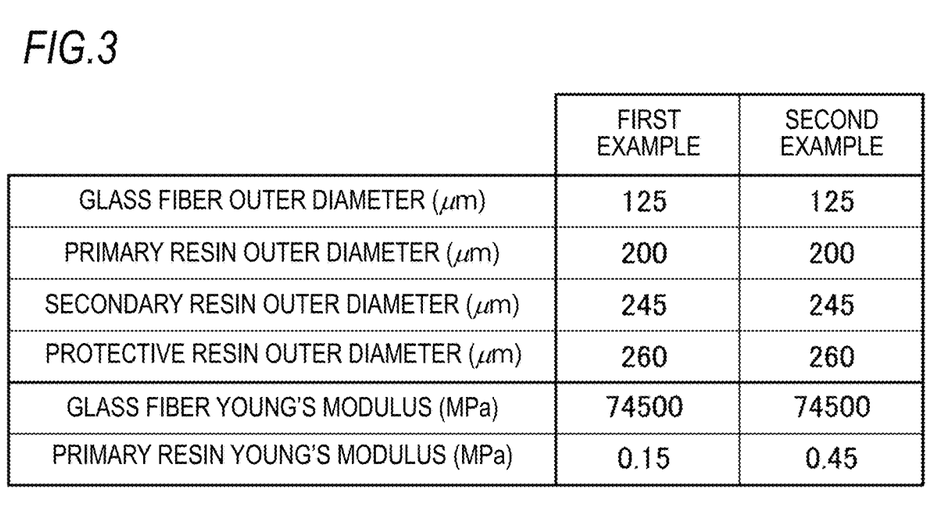
FIG. 3 is a table showing specifications of an optical fiber used as examples of a simulation related to the splicing portion of the optical fiber according to the present disclosure.
Figure 4A:
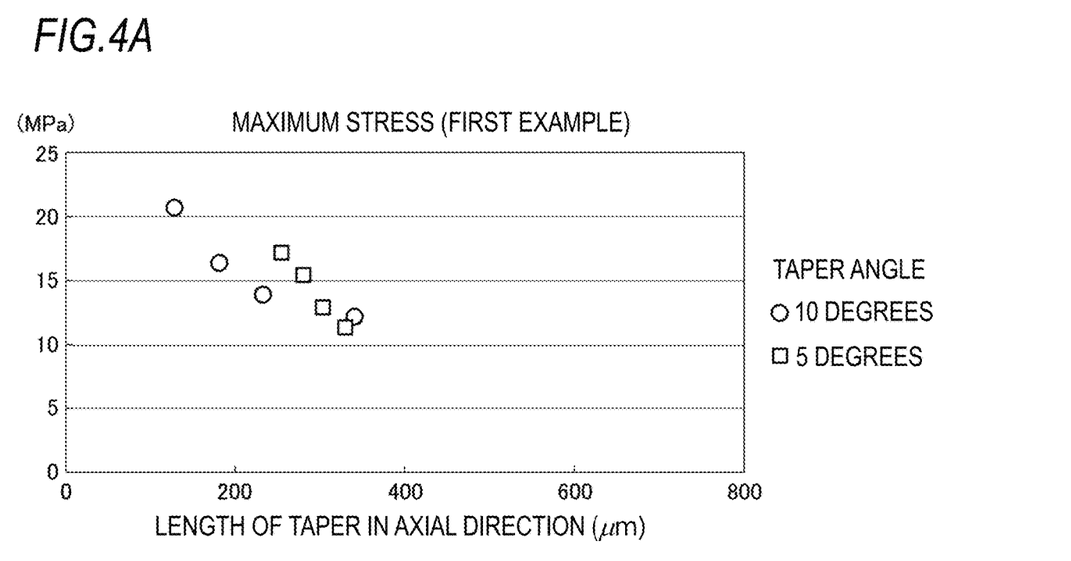
FIG. 4A is a diagram illustrating the magnitude of maximum stress acting on a protective resin when a taper angle and a taper length are respectively changed by using an optical fiber of a first example shown in the specifications of FIG. 3.
Figure 4B:
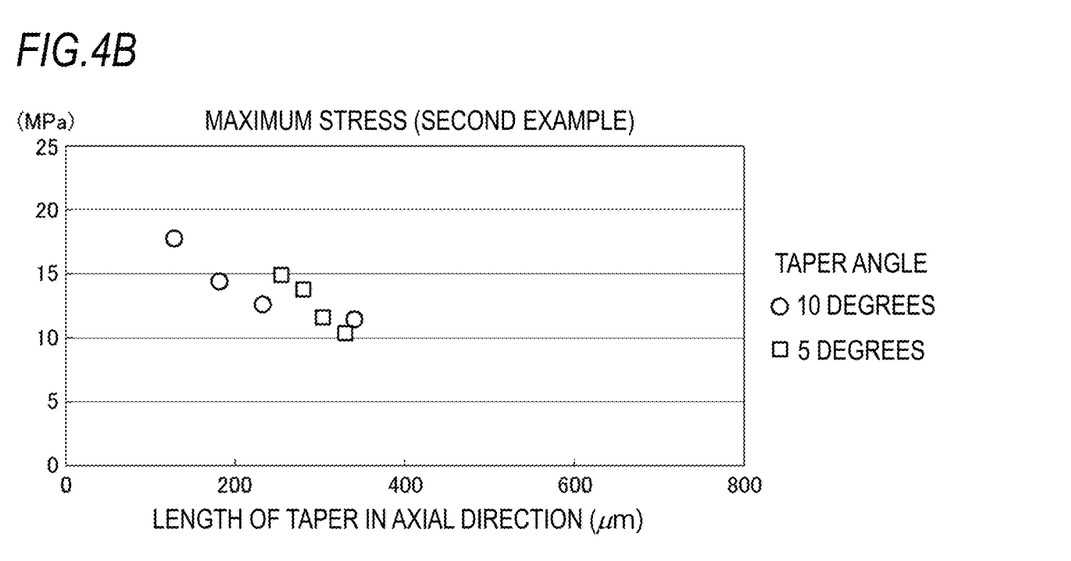
FIG. 4B is a diagram illustrating the magnitude of maximum stress acting on the protective resin when the taper angle and the taper length are respectively changed by using an optical fiber of a second example shown in the specifications of FIG. 3.

FIG. 3 is a table showing specifications of an optical fiber used as examples of a simulation related to the splicing portion of the optical fiber of the present disclosure. FIGS. 4A and 4B are diagrams illustrating the magnitude of the maximum stress acting on the protective resin when the optical fiber shown in the specifications of FIG. 3 is used and the angle of the taper and the length thereof are respectively changed.

In the simulation, two types of optical fibers according to first and second examples are targeted. The optical fibers according to the first and second examples have the same specifications except that the Young's modulus of the primary resin layer and that of the secondary resin layer are different. Specifically, in both examples, an outer diameter of the glass fiber is set to 125 μm, an outer diameter of the primary resin layer is set to 200 μm, an outer diameter of the secondary resin layer is set to 245 μm, an outer diameter of the protective resin provided at the splicing portion is set to 260 μm, and the Young's modulus of the glass fiber is set to 74500 MPa. Meanwhile, in the optical fiber according to the first example, the Young's modulus of the primary resin layer is set to 0.15 MPa, and in the optical fiber according to the second example, the Young's modulus of the primary resin layer is set to 0.45 MPa.

With respect to the optical fibers according to the first and second examples, the simulation investigates a change in the maximum value of the internal stress of the protective resin 30 when the angle θ of the taper T illustrated in FIG. 2 and a length L of the taper T in an axial direction of the optical fiber are changed. Here, the length L of the taper T in the axial direction of the optical fiber is a length obtained by projecting a length from a starting point of the taper T of the secondary resin layer 22 up to an ending point of the taper T of the primary resin layer 21 in the axial direction of the optical fiber. With respect to the angle θ of the taper T, the taper of 5 to 10 degrees is used in consideration of actual workability, such that the angle θ of the taper T is set to 5 degrees and 10 degrees in the simulation.

FIGS. 4A and 4B are diagrams respectively illustrating results of the optical fibers according to the first and second examples. The length L of the taper in the axial direction is plotted in a horizontal axis, and the maximum value of the internal stress of the protective resin is plotted in a vertical axis. A circle mark is plotted when the angle θ of the taper is 10 degrees, and a square mark is plotted when the angle θ of the taper is 5 degrees.

In the optical fibers according to the first and second examples, even when the angle θ of the taper is 10 degrees or 5 degrees, the maximum value of the internal stress tends to decrease as the length L of the taper in the axial direction increases. When the taper angle is 5 degrees which is small, the change in the maximum value of the internal stress with respect to the change in the length L of the taper in the axial direction becomes larger. Further, it is found out that the maximum value of the internal stress becomes greater in the case of the first example in which a resin softer than that of the second example is used for the primary resin layer 21.

Next, in order to obtain a relationship between the magnitude of the maximum value of the internal stress acting on the protective resin and the occurrence of the crack X, as a result of performing an experiment by using an actual optical fiber, it is found out that the crack occurs when the maximum value of the internal stress acting on the protective resin exceeds 15 MPa.

Therefore, by obtaining a characteristic of the shape of the taper T in which the maximum value of the internal stress becomes equal to or less than a threshold value of 15 MPa from the simulation result, it is found out that, at a normally used taper angle, the maximum value of the internal stress becomes equal to or less than the threshold value of 15 MPa when the length L of the taper in the axial direction is equal to or greater than 280 μm. In case where a taper having the taper length L in the axial direction of 280 μm or greater is formed, in any case, the taper T is formed to include the boundary A between the primary resin layer 21 and the secondary resin layer 22. Here, the taper T may not reach the glass fiber 10.

As the Young's modulus of the primary resin layer becomes greater, the maximum value of the internal stress of the protective resin becomes smaller, thereby making it possible to prevent the occurrence of the crack. However, when the Young's modulus of the primary resin layer is increased, the loss at the time of bobbin winding increases as described above. Therefore, in consideration of the loss at the time of bobbin winding, it is desirable that the Young's modulus of the primary resin layer is equal to or less than 0.5 MPa. The second example shows the case in which the Young's modulus of the primary resin layer is 0.45 MPa. Even when the Young's modulus is equal to or less than 0.5 MPa, by setting the length L of the taper in the axial direction to 280 μm, the maximum value of the internal stress of the protective resin can be set to be equal to or less than the threshold value of 15 MPa. When the Young's modulus of the secondary resin layer is equal to or greater than 800 MPa, there is a small influence on the maximum value of the internal stress of the protective resin, and by setting the length L of the taper in the axial direction to 280 μm, the maximum value of the internal stress of the protective resin can be set to be equal to or less than the threshold value of 15 MPa.

REFERENCE SIGNS LIST

1: optical fiber
2: fusion-splicing portion
10: glass fiber
11: core
12: clad
20: fiber coating layer
21: primary resin layer
22: secondary resin layer
30: protective resin

The invention claimed is:

1. A method for manufacturing an optical fiber, the method comprising:
    a step of exposing a glass fiber by stripping a fiber coating layer at an end portion, on a splicing side, of each of a pair of optical fibers;
    a step of fusion-splicing end surfaces of the glass fibers;
    a step of recoating a protective resin on a periphery of exposed portions of the glass fibers,
    wherein the fiber coating layer includes a primary resin layer on an inner peripheral side and having a Young's modulus of 0.5 MPa or less and a secondary resin layer on an outer peripheral side and having a Young's modulus of 800 MPa or greater,
    wherein the step of exposing is a step of forming a shape of a coating edge of the fiber coating layer which includes the primary resin layer and the secondary resin layer into a tapered shape which becomes narrower toward the end portion side, and
    wherein the step of recoating is a step of coating the protective resin to include the coating edge, and
    a step of cooling a portion of the optical fiber to increase the Young's modulus of the primary resin layer, prior to the step of exposing,
    wherein the step of exposing is a step of forming the coating edge of the fiber coating layer into the tapered shape.

* * * * *